Feb. 18, 1936.  F. V. WALTZ  2,031,439
WEIGHING SCALE
Filed April 15, 1935   2 Sheets-Sheet 1
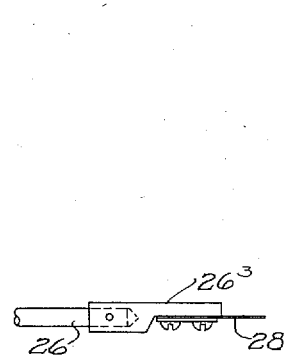
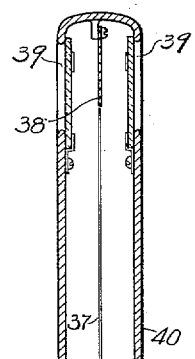
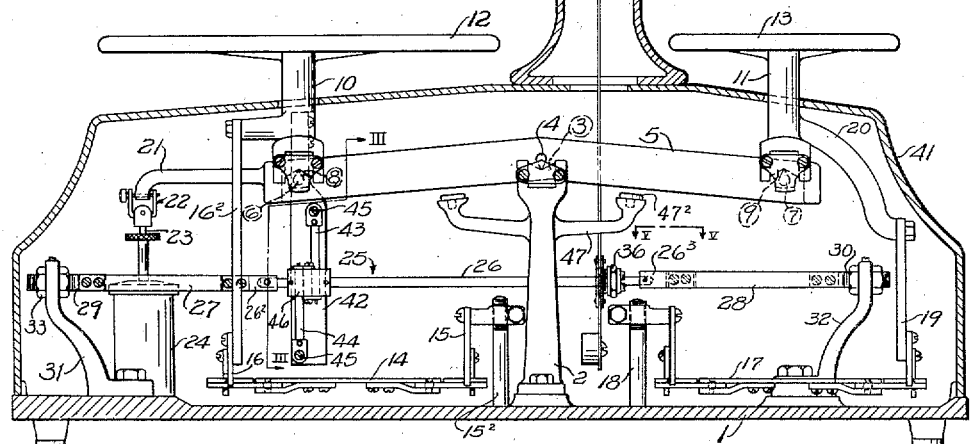
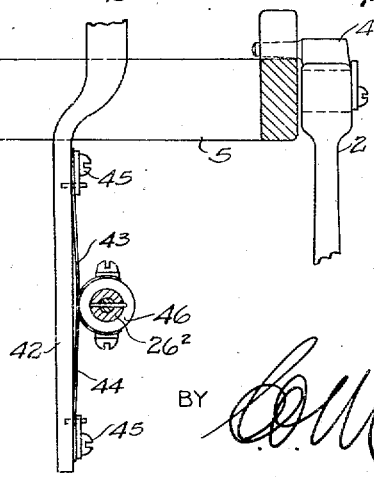
Foster V. Waltz
INVENTOR
BY Marshall
ATTORNEY

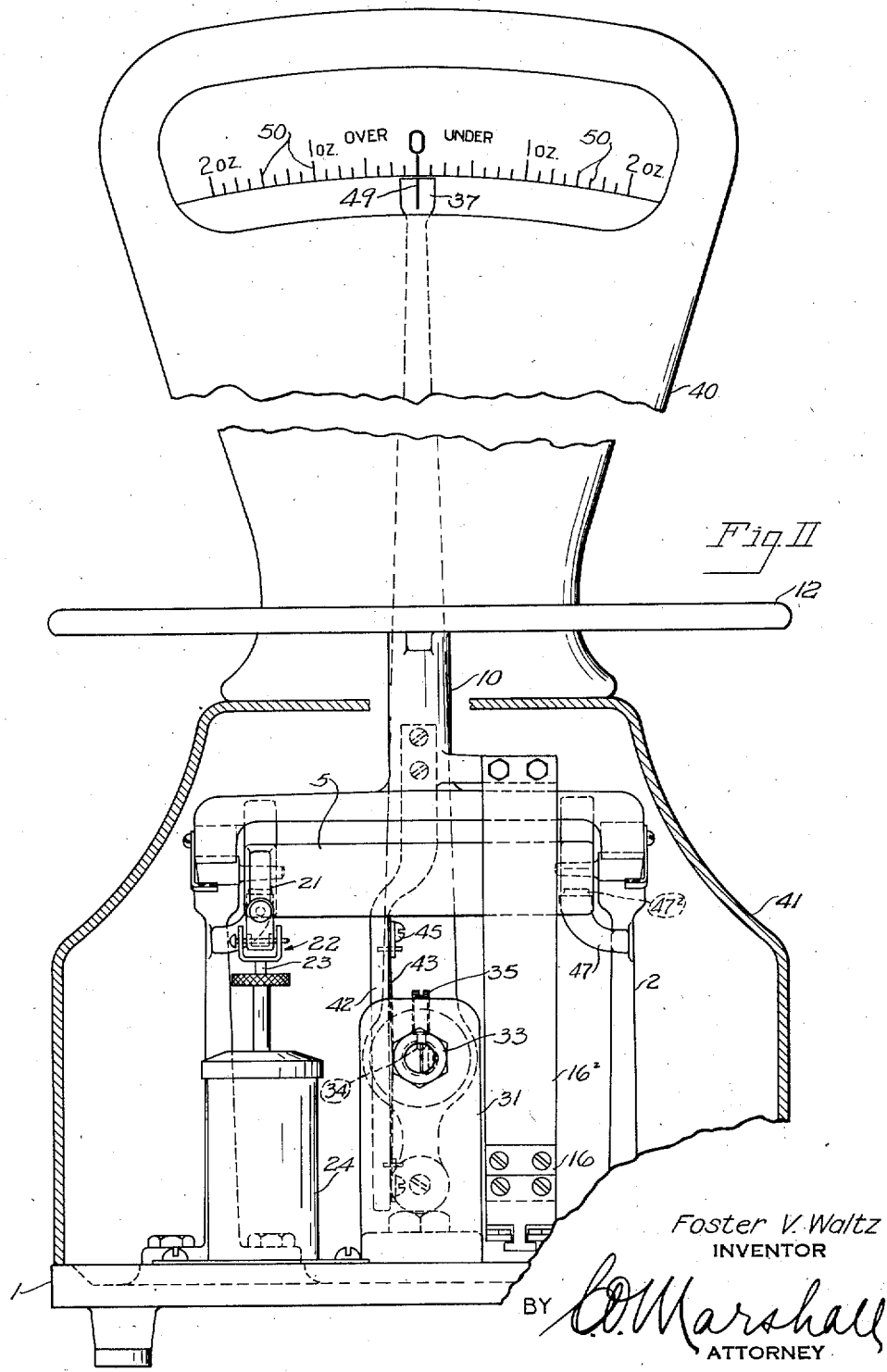

Patented Feb. 18, 1936

2,031,439

UNITED STATES PATENT OFFICE 2,031,439

WEIGHING SCALE

Foster V. Waltz, Toledo, Ohio, assignor to Toledo Scale Manufacturing Company, Toledo, Ohio, a corporation of New Jersey Application April 15, 1935, Serial No. 16,269

4 Claims. (Cl. 265—58)

This invention relates to weighing scales and has for its principal object the provision of a predetermined weight scale in which the predetermined load is counterbalanced by gravity and which will weigh correctly when in an unlevel position.

Another object of the invention is the provision of a predetermined weight scale of great sensitiveness which will automatically indicate the amount which is in excess or deficient of a predetermined weight of a commodity.

Another object is the provision of improved means in a predetermined weight scale whereby the oscillation of the main lever is reduced to a comparatively small angle yet permitting a large movement of an indicating hand for small increments of weight.

Another object is the provision of improved means whereby an indicator may be adjusted about its turning axis to indicate, with cooperation of proper housing means, in a vertical, as well as positions other than vertical.

Still another object is the provision of improved means for counterbalancing the amount of commodity in excess or deficient of a predetermined weight; and, A still further object is the provision of improved means for adjusting and varying the counterbalancing effect of such counterbalancing means.

These, and other objects and advantages will be apparent from the following description in which reference is had to the accompanying drawings wherein similar reference numerals refer to similar parts throughout the several views.

Referring to the drawings:—

Figure I is a side elevational view of my improved device, base and housing members being sectioned on their longitudinal axis.

Figure II is an enlarged elevational view of the device shown in Figure I, parts being broken away and the base casing member is sectioned to more clearly show the arrangement of the lever mechanism.

Figure III is an enlarged fragmentary view substantially along the line III—III of Figure I.

Figure IV is a fragmentary sectional view of the means for adjusting the tension of the auxiliary load counterbalancing means; and Figure V is a fragmentary plan view of a portion of said means viewed substantially from a line V—V of Figure I.

Referring to the drawings in detail:—

To suitably machined pads on base casting 1 is fastened a lever fulcrum frame 2, the upper ends of which are bifurcated and have bearings 3 mounted in the bifurcations. These bearings 3 form seats for fulcrum pivots 4 of an even armed lever 5. The free ends of this lever 5 are provided with load and counterpoise pivots 6 and 7 respectively upon which, by means of suitable bearings 8 and 9, a load receiver frame 10 and a counterpoise receiver frame 11 are mounted. These frames support a load receiver 12 and a counterpoise receiver 13 respectively. The condition of level of the load receiver is maintained by a check mechanism which comprises a check link 14 which is of the well known so-called French stay type and, therefore, requires no further detailed description. However, any efficient check link may be employed in its place. One end of the check link 14 is pivotally connected to a suitable member 15 which is adjustably secured to a stud $15^2$ rigidly fixed in the base 1. The other end of the check link 14 is pivotally connected to a member 16 fastened to the lower extremity of a downwardly extending rigid plate $16^2$, whose upper end is fastened to an extending boss of the load receiver frame 10. The counterpoise receiver 13 is similarly stayed by another check link 17 connected to a rigidly fixed stud 18 at one end and to a plate 19 which is bolted to a downwardly extending arm of the counterpoise receiver 11.

For the purpose of damping the vibrations of the lever and the mechanism connected thereto during a weighing operation to permit quick and accurate results an arm 21 of the lever extends outwardly to which a universal joint 22 is secured in a suitable manner. The upper end of a plunger rod 23 is fixed in a portion of the universal joint and to the lower end of which a plunger disk is attached which dips into a suitable liquid of a dashpot 24.

The scale thus far described constitutes an even balance scale which is well adapted to compare masses by placing an unknown load upon the load receiver 12 and sufficient standard weights upon the counterpoise receiver 13 until the lever has again assumed the position of equilibrium when the load is balanced.

It is an object of the invention, however, to automatically indicate amounts which are in excess of or deficient from the predetermined amount and for this purpose I have provided an auxiliary load counterbalancing mechanism 25 which functions only when the unknown load is in excess or deficient from the desired load and is used generally to show the amount of commodity which must be removed from or added to the load. When the scale is in equilibrium the load is entirely counterbalanced by the action of gravity and no external force influences the condition of equilibrium.

This auxiliary counterbalancing mechanism comprises a cylindrical rod 26, preferably made from steel hardened and ground to an accurate diameter, the ends of which are studded into cylindrical members $26^2$ and $26^3$. These cylindrical members are provided with a flat surface which is coincident with their longitudinal axis and thus coincident with the longitudinal axis of the rod 26. To these flat surfaces ends of flexible metallic ribbons 27 and 28 are securely fastened by means of clamping plates and suitable screws (see Figure V). The other ends of these metallic ribbons 27 and 28 are clamped in a similar manner to flat faces milled on threaded studs 29 and 30 which extend through openings in vertical portions of brackets 31 and 32 which are bolted to the base 1 as shown in Figure I. These studs 29 and 30 may be horizontally adjusted by loosening one and tightening the other nut 33 which hold them in the proper position in the brackets 31 and 32. To prevent these studs from being rotated on their longitudinal axis a keyway 34 is machined in the studs 29 and 30 for the reception of tenons of set screws 35 threaded through apertures in the top of brackets 31 and 32 (Figure IV).

Mounted upon the rod 26 by means of a hub 36 is an indicator 37 extending vertically upward in the plane of a chart 38 which is fastened in the upper portion in back of windows 39 of a chart housing 40 which surmounts a base casing 41 to which it is fastened. This base casing 41 rests on the base 1 to which it is securely bolted.

To connect the auxiliary load counterbalancing mechanism hereinbefore described to the weighing scale, the load receiver supporting frame 10 is provided with a downwardly extending member 42 having a flat surface to which ends of opposite extending flexible metallic ribbons 43 and 44 are clamped by means of screws 45. The other ends of these ribbons extend partially around and are fastened to a cylindrical collar 46 circumjacently mounted on the rod 26 and parallel to the flat surface of the downwardly extending member 42.

It is an object of the invention to obtain the greatest possible moment of the indicator and the smallest possible angular oscillation of the lever. For this reason this auxiliary counterbalancing mechanism hereinbefore described is mounted in the base portion of the scale below the lever so that the multiplication of the indicator may be made extremely large. Since it is also desirable to have the combined length of the metallic ribbons 27 and 28 as long as possible so as not to affect the modulus of elasticity of the material the longitudinal position below the lever is also an object of the invention for this purpose.

When it is desired to weigh out one pound of a commodity, the operator places a standard one pound weight on the counterpoise receiver 13. This overbalances the weighing mechanism and the right hand end of the lever 5 (Figure I) moves downwardly until it strikes bumpers $47^2$ which in this embodiment of the invention are seated in arms 47 which form a part of the fulcrum bracket 2. For scales of higher capacity, however, it is desirable that the bumpers are positioned to engage the lever adjacent the load and counterpoise pivots 6 and 7. Since the lever is connected through the member 42 the ribbons 43 and 44 to the rod 26 on which the indicator 37 is mounted every movement made by the lever is partaken of by the indicator. In the example just stated, the indicator moved across the "under" half of the chart 38 in a clockwise direction.

One pound of commodity now placed on the load receiver 12 will restore the condition of balance of the scale and the indicator will move in an anticlockwise direction until an index line 49 registers with a zero graduation on the chart 38. When, however, the amount of the commodity, which is placed on the load receiver 12, is slightly in excess of one pound the additional forces exerted by this overage will effect a downward movement of the left hand end of the lever 5 and through the hereinbefore mentioned connection rotate the rod 26 on which the indicator 37 is secured until the torsional resistance of the ribbons 27 and 28 counterbalances the overage exactly. Since the angularity of the lever 5 and the position of the indicator 37 is proportionate to the overload the index line 49 will register with that graduation 50 on the chart 38 which indicates the amount of such overage. When the amount of commodity which is placed on the receiver 12 is less than the mass of the standard one pound weight on a counterpoise receiver 13 the indicator will not return to the zero graduation but will stop at that graduation 50 on the "under" side of the chart 38 which represents the amount of the deficiency of the torsional resistance in the opposite direction of the metallic ribbons affecting the proportional position of the lever and indicator in the well known manner.

It will be seen that the embodiment of the invention is well adapted to fufill the objects primarily stated. It is to be understood, however, that it is subject to variation, modification and change within the spirit and scope of the subjoined claims.

Having described my invention, I claim:—

1. In a device of the class described, in combination, a lever oscillatively mounted thereon, load and counterpoise receptacle mounted upon free ends of said lever, torsional resistance means upon said base and below said lever and extending parallel to the longitudinal axis of said lever, said torsional resistance means having an indicator connected thereto and connecting means connected to one of said receptacles and to said torsional resistance means whereby movement proportional to the weight of a load on said receptacle is transmitted to said indicator and means including an index to cooperate with said indicator for indicating the condition of equipoise of said lever.

2. In a device of the class described, in combination, a base, a lever oscillatively mounted thereon, load and counterpoise receptacles mounted on free ends of said lever, torsional resistance means mounted upon said base and below said lever and extending parallel to the longitudinal axis of said lever, said torsional resistance means having an indicator connected thereto and connecting means connected to one of said receptacles and said torsional resistance means whereby means proportional to the weight of the load on one of said receptacles is transmitted to said indicator, said indicating means comprises a plurality of flexible means, ends thereof being substantially attached to said receptacle and the other ends being attached to said torsional resistance means.

3. In a device of the class described, in combination, a base, a lever mounted upon said base, said lever being mounted to oscillate on its transverse axis, an indicator pivoted below said lever and adapted to be rotated in a plane parallel to the oscillating axis of said lever, a chart mounted above said lever for cooperation with said indicator and means cooperating with said lever and said indicator whereby oscillation of one of said members in one direction is transmitted and converted into an oscillating movement of the other member in a different direction.

4. In a device of the class described, in combination, a base, a lever mounted upon said base, said lever being mounted to oscillate on its transverse axis, an indicator pivoted below said lever and adapted to be rotated in a plane parallel to the oscillating axis of said lever, a chart mounted above said lever for cooperation with said indicator and means cooperating with said lever and said indicator whereby oscillation of one of said members in one direction is transmitted and converted into an oscillating movement of the other member in a different direction and a damping device connecting to one of said members for controlling the oscillation of both of said members.

FOSTER V. WALTZ.